United States Patent [19]

Ennis

[11] 4,066,431

[45] Jan. 3, 1978

[54] SYNTHETIC N-RELEASING SOIL CONDITIONER

[76] Inventor: Daniel Martin Ennis, 3416 Tulane Drive, No. 12, Hyattsville, Md. 20783

[21] Appl. No.: 615,121

[22] Filed: Sept. 19, 1975

[51] Int. Cl.$^2$ ............................................. C05C 11/00
[52] U.S. Cl. ............................................. 71/27; 71/1;
 71/64 SC; 47/9; 47/DIG. 10
[58] Field of Search ................ 71/27, 64 SC, 1; 47/9, 47/DIG. 10; 260/501.2

[56] References Cited

U.S. PATENT DOCUMENTS 3,831,317  8/1974  Porte ................................ 71/64 S X

FOREIGN PATENT DOCUMENTS 1,359,433  7/1974  United Kingdom ............. 71/64 SC

OTHER PUBLICATIONS

Chem. Abst. 57046j, Porte, vol. 78, 1973, p. 416.

*Primary Examiner*—Wilbur L. Bascomb, Jr.
*Assistant Examiner*—Ferris H. Lander
*Attorney, Agent, or Firm*—Burns, Doane, Swecker & Mathis

[57] ABSTRACT

Hexamethylenediamine adipate, $NH_3^+-(CH_2)_6-NH_3^+COO^--(CH_2)_4-COO^-$ (Nylon Salt), is a nitrogen-containing soil conditioner. Degradation of hexanediamine in the soil by bacteria and fungi releases ammonia which may be interconverted with nitrate to supply nitrogen for the growing plant.

11 Claims, No Drawings

SYNTHETIC N-RELEASING SOIL CONDITIONER

SUMMARY

Studies on the use of Nylon Salt when applied to soil demonstrated its use for improvements in aggregate stability, permeability, flocculation of soil suspensions and seedling emergence of "Manapal" tomato. Hexamethylenediamine is degraded by soil bacteria and fungi (notably *Aspergillus niger*, Alcaligenes and Flavobacterium) releasing ammonia through the amine-oxidase reaction:

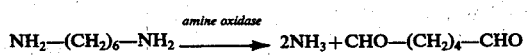

$$NH_2-(CH_2)_6-NH_2 \xrightarrow{amine\ oxidase} 2NH_3 + CHO-(CH_2)_4-CHO$$

Interconversion of ammonia with nitrite and nitrate would provide nitrogen for the growing plant.

DETAILED DESCRIPTION

The development of good soil structure with its beneficial effects on drainage, aeration, rooting and nutrient uptake is important to the production of agricultural crops. A synthetic chemical which would improve soil structure would be valuable for increasing yields in presently cultivated areas and for expanding production into hitherto structurally inhibiting soils. Additional benefit would be derived from such a chemical if, on degradation in the soil, an essential nutrient such as nitrogen was released.

Table 1 shows that when a 10% suspension of the <0.045 mm fraction (clay-silt fraction) of a silt loam is treated with various concentrations of Nylon Salt, flocculating ability is statistically apparent at 75 ppm. Higher concentrations show higher flocculation. Flocculation was measured by % transmittance in a spectrophotometer at 525 nm (this wavelength was shown to exhibit minimum absorption).

Table 1.

Flocculation of the clay-silt fraction of a silt loam

| Nylon Salt Conc. (ppm) | % transmittance at 525 nm[2] (after 24 hours) |
|---|---|
| 0 | 2.8 a |
| 10 | 2.5 a |
| 30 | 3.7 a |
| 75 | 82.9 b |
| 150 | 93.5 c |
| 300 | 96.0 c |

[2]Mean separation within columns by Student-Newman-Keule test, at 5% level. Each mean consists of 4 samples.

Table 2 indicates that when the <0.25 mm fraction of a silt loam is treated with various concentrations of Nylon Salt and air-dried for five days, aggregate stability and permeability are improved. Aggregate stability refers to the erosion strength of the particles formed by the conditioner and permeability reflects drainage capabilities. Aggregate stability improves from 0.5% for distilled water to 23.4% for Nylon Salt at a concentration of 0.3% of over-dried soil. Permeability improves by about 120% — from 10.4 ml/sq. cm./hr. to 22.6 ml/sq cm./hr.

Table 2.

Aggregate stability and permeability of the <0.25 mm fraction of a silt loam

| Nylon Salt Conc. (%) | Stable aggregates[2] >0.25 mm (%) | Permeability <0.25 mm (ml/sq cm/hr) |
|---|---|---|
| 0.000 | 0.5 a | 10.4 a |
| 0.010 | 0.4 a | 12.9 a |
| 0.075 | 15.0 b | 18.8 b |
| 0.300 | 23.4 c | 22.6 b |

[2]Mean separation as above, each mean consists of 3 samples.

Table 3 shows that these soil improvements may be reflected in seedling emergence. The cultivar used is "Manapal" and seedling emergence improved for all concentrations of Nylon Salt from 0.005% to 0.5% of air-dried soil when applied prior to sowing. All treatments were significantly higher than the distilled water treatment, but not different from each other.

Table 3.

Germination capacity of the tomato (cultiver Manapal) treated with four concentrations of NS prior to sowing

| NS conc. (% air-dried soil) | Germination (%)[2] |
|---|---|
| 0.000 | 61.5 a |
| 0.005 | 81.3 b |
| 0.050 | 75.3 b |
| 0.250 | 77.5 b |
| 0.500 | 82.5 b |

[2]Means separated within columns by Student-Neuman-Keule test, at 5% level. Each mean consists of 3 samples Table 4 shows the identity of soil bacterial isolates capable of utilizing hexamethylenediamine as a sole nitrogen source. *Aspergillus niger* is known to possess an amine oxidase enzyme system so that conversion of hexamethylenediamine to the aldehyde and ammonia would occur in soils.

Table 4.

Hexamethylenediamine as N source for soil isolates

| Isolate | Identity |
|---|---|
| 1 | Aspergillus niger |
| 2 | Flavobacterium (ferrugineum) |
| 3 | Flavobacterium spp. |
| 4 | Alcaligenes (paradoxus) |
| 5 | Flavobacterium spp. |

Table 5 indicates that apical nitrogen (top 2 cm) is increased in seven week old tomato plants when Nylon Salt is applied to soil at the seedling transplantation stage.

Table 5.

Effect of Nylon Salt on apical nitrogen

| Nylon Salt conc. (%) | Apical nitrogen (%) |
|---|---|
| 0.00 | 2.3 |
| 0.03 | 2.3 |
| 0.07 | 2.7 |

The preceeding studies demonstrate that Nylon Salt when applied to soils in water at low concentrations can influence aggregate stability, permeability, seedling emergence and nitrogen uptake. The flocculating ability of Nylon Salt at concentrations of 75–300 ppm in a 10% clay suspension further demonstrate its soil conditioning properties. The uniqueness of the compound for soil applications lies both in its ability to behave as a soil conditioner and, on degradation, to behave as a nitrogen fertilizer. Because of the effect of Nylon Salt on aggregate stability, this material may be applied to soils to control erosion for agricultural and non-agricultural purposes.

I claim:

1. The method of improving soil structure which consists of applying an aqueous solution of hexamethylenediamine adipate to clay-containing soil in an amount which is the equivalent of at least about 0.005% of oven-dried clay-containing soil particles of a size less than 0.25 millimeters and which is effective to achieve said structure improvement.

2. The method as defined in claim 1 wherein the said amount is the equivalent of 0.075 to 0.3% of oven-dried, clay-containing particles of size less than 0.25 mm.

3. The method as defined in claim 1 wherein the improvement comprises an increase in soil aggregate stability.

4. The method as defined in claim 1 wherein the improvement comprises an increase in soil permeability.

5. The method of improving seedling emergence which consists of applying an aqueous solution of hexamethyleneadimine adipate to clay-containing soil prior to sowing in an amount which is the equivalent of at least about 0.005% of oven-dried, clay-containing soil particles of a size less than 0.25 millimeters and which is effective to improve seedling emergence.

6. The method as defined in claim 1, characterized in that soil applications of hexamethylenediamine adipate are made following seedling emergence.

7. The method as defined in claim 1 wherein the improvement comprises increased soil erosion control.

8. The method of providing nitrogen for a growing crop comprising applying an aqueous solution of hexamethylenediamine adipate to clay-containing soil in an amount which is the equivalent of at least about 0.07% of oven-dried, clay-containing soil particles of a size less than 0.25 millimeters and in an amount effective to provide said nitrogen to the growing crop.

9. The method as defined in claim 8, characterized in that said application is made prior to sowing.

10. The method as defined in claim 8, characterized in that said application is made following seedling emergence.

11. The method of improving soil structure which consists of applying hexamethylenediamine adipate to clay-containing soil in an amount which is the equivalent of at least about 0.005% of oven-dried, clay-containing soil particles of a size less than 0.25 millimeters and which is effective to achieve said structure improvement.

* * * * *